United States Patent
Yang et al.

(10) Patent No.: US 10,411,832 B2
(45) Date of Patent: Sep. 10, 2019

(54) ETHERNET PHYSICAL LAYER DEVICE HAVING INTEGRATED PHYSICAL CODING AND FORWARD ERROR CORRECTION SUB-LAYERS

(71) Applicant: GLOBALFOUNDRIES INC., Grand Cayman (KY)

(72) Inventors: Kai Yang, Beijing (CN); Yang Liu, Shanghai (CN); Jilei Yin, Beijing (CN); Wei Jiang, South Burlington, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 344 days.

(21) Appl. No.: 15/336,974

(22) Filed: Oct. 28, 2016

(65) Prior Publication Data

US 2018/0123733 A1     May 3, 2018

(51) Int. Cl.
H04L 1/00 (2006.01)

(52) U.S. Cl.
CPC .......... *H04L 1/0052* (2013.01); *H04L 1/0043* (2013.01)

(58) Field of Classification Search
CPC ... H04L 1/0058; H04L 1/0041; H04L 1/0052; H04L 1/0043
USPC ...................................................... 714/776
See application file for complete search history.

(56) References Cited

U.S. PATENT DOCUMENTS

| | | | |
|---|---|---|---|
| 6,873,630 B1* | 3/2005 | Muller | H04L 29/06 370/356 |
| 8,572,300 B2 | 10/2013 | Wu et al. | |
| 8,924,826 B2 | 12/2014 | Kim et al. | |
| 9,047,204 B2* | 6/2015 | Ganga | H03M 13/33 |
| 9,432,298 B1* | 8/2016 | Smith | H04L 49/9057 |
| 2013/0343439 A1 | 12/2013 | Wentroble et al. | |
| 2014/0380132 A1* | 12/2014 | Ran | H04L 1/0057 714/776 |
| 2015/0055644 A1 | 2/2015 | Bordogna et al. | |

(Continued)

OTHER PUBLICATIONS

John D'Ambrosia et al., "802.3bj FEC Overview and Status", IEEE 802.3bm Ethernet Study Group, Sep. 2012, pp. 1-12.

(Continued)

*Primary Examiner* — Albert Decady
*Assistant Examiner* — Enam Ahmed
(74) *Attorney, Agent, or Firm* — Gibb & Riley, LLC; David A. Cain, Esq.

(57) ABSTRACT

Disclosed are Ethernet physical layer devices (e.g., a transceiver, a receiver and a transmitter) with integrated physical coding and forward error correction sub-layers. Each physical layer device includes a physical coding sub-layer (PCS), a forward error correction sub-layer (FEC) and integration block(s). Each integration block halts, for some number of clock cycles, a data stream in portions of a data path (e.g., portions of a transmitter (TX) data path or portions a receiver (RX) data path) within the PCS and the FEC in order to compensate for processing of that data stream by a data processor (e.g., a code word mark (CWM) inserter or a CWM remover) contained in the portion of the data path within the FEC. Use of such integration block(s) eliminates the need for redundant components in the PCS and FEC, thereby reducing latency, costs and chip area consumption. Also disclosed are associated methods.

20 Claims, 8 Drawing Sheets

(56) References Cited

U.S. PATENT DOCUMENTS

| | | |
|---|---|---|
| 2015/0288484 A1* | 10/2015 | Nie .................. H04L 1/0057 |
| | | 714/776 |
| 2015/0381312 A1 | 12/2015 | Basso et al. |
| 2015/0381338 A1 | 12/2015 | Basso et al. |
| 2016/0099795 A1 | 4/2016 | Lusted et al. |

OTHER PUBLICATIONS

Adee Ran et al., "Latency and FEC Options for 25G Ethernet", IEEE 802.325 Gb/s Ethernet Study Group, Aug. 12, 2014, pp. 1-12.
Ilango Ganga, "IEEE 802.3ba 40 and100 Gigabit Ethernet Architecture", IEEE ComSoc SCV, Santa Clara, CA,Oct. 2010, pp. 1-15.

\* cited by examiner

ETHERNET PHYSICAL LAYER DEVICE HAVING INTEGRATED PHYSICAL CODING AND FORWARD ERROR CORRECTION SUB-LAYERS

FIELD OF THE INVENTION

The present invention relates to an Ethernet physical layer device and, more specifically, to an Ethernet physical layer device with integrated physical coding and forward error correction sub-layers.

BACKGROUND

The Open Systems Interconnection (OSI) model characterizes and standardizes communications functions in networking applications. The OSI model, regardless of the networking technology, has several layers including: a physical layer, a data link layer, a network layer, a transport layer, a session layer, a presentation layer and an application layer. "Ethernet" refers to a family of networking technologies that are, for example, commonly used in local area networks (LANs) and metropolitan area networks (MANs). Different Ethernet networking technologies are defined by the rate (e.g., in Gigabits/second (Gb/s)) at which Ethernet frames are transmitted and these different Ethernet networking technologies are governed by different sub-sections under the Institute of Electrical and Electronics Engineers (IEEE) Standards 802. In any case, the different Ethernet networking technologies will have the same OSI model layers. That is, the OSI model layers referenced above will be present in each of the different Ethernet networking technologies. However, depending upon the Ethernet networking technology at issue, the architecture of a particular OSI model layer (e.g., the physical layer) may vary and improvements (e.g., to reduce latency, costs and/or chip area consumed) are desirable.

SUMMARY

Disclosed herein are Ethernet physical layer devices (e.g., a transceiver, a receiver and a transmitter) with integrated physical coding and forward error correction sub-layers. Each physical layer device can include a physical coding sub-layer (PCS), a forward error correction sub-layer (FEC) and integration block(s). Each integration block can halt, for some number of clock cycles, a data stream in portions of a data path (e.g., portions of a transmitter (TX) data path or portions a receiver (RX) data path) within the PCS and the FEC in order to compensate for processing of that data stream by a data processor (e.g., a code word mark (CWM) inserter or a CWM remover) contained in the portion of the data path within the FEC. Use of such integration block(s) eliminates the need for redundant components in the PCS and FEC, thereby reducing latency, costs and chip area consumption. Also disclosed herein are associated methods.

More specifically, disclosed herein are embodiments of an Ethernet physical layer device (e.g., a transceiver, a receiver or a transmitter). The physical layer device can have multiple sub-layers including, but not limited to, a physical coding sub-layer (PCS) and a forward error correction sub-layer (FEC). At least one data path (e.g., a transmitter (TX) data path and/or a receiver (RX) data path) can extend across the PCS and the FEC. The physical layer device can further have one or more integration blocks that integrate the PCS and the FEC. Specifically, each integration block can be in communication with a data processor in a portion of the data path within the FEC and can halt, for some number of clock cycles, a data stream in the portions of the data path within PCS and the FEC so as to compensate for processing of the data stream by the data processor.

One particular embodiment disclosed is an Ethernet physical layer transceiver. The transceiver can have multiple physical layer sub-layers including, but not limited to, a physical coding sub-layer (PCS) and a forward error correction sub-layer (FEC). The transceiver can further have a transmitter (TX) side and a receiver (RX) side and data paths on each side that extend across the PCS and the FEC (i.e., a TX data path and an RX data path). The transceiver can further have a pair of physical coding sub-layer and forward error correction sub-layer integration blocks. The pair of integration blocks can include both a first integration block that integrates the PCS and the FEC on the transmitter (TX) side of the transceiver and a second integration block that integrates the PCS and the FEC on the receiver (RX) side of the transceiver. The first integration block can be in communication with a code word mark (CWM) inserter in a portion of the TX data path within the FEC and can halt, for a first number of clock cycles, a TX data stream in the portions of the TX data path within the PCS and the FEC in order to compensate for CWM insertion into the TX data stream by the CWM inserter. The second integration block can be in communication with a CWM remover in a portion of the RX data path with the FEC and can halt, for a second number of clock cycles, an RX data stream in portions of the RX data path within the PCS and FEC to compensate for CWM removal from the RX data stream by the CWM remover.

Also disclosed herein are embodiments of a method of operating an Ethernet physical layer device (e.g., a transceiver, a transmitter or a receiver). The method can include providing a physical layer device, as described above. Specifically, this physical layer device can have multiple sub-layers including, but not limited to, a physical coding sub-layer (PCS) and a forward error correction sub-layer (FEC). At least one data path (e.g., a transmitter (TX) data path and/or a receiver (RX) data path) can extend across the PCS and the FEC. The physical layer device can further have at least one integration block that integrates the PCS and the FEC. The method can further include halting, by the integration block for some number of clock cycles, a data stream in portions of a data path within the PCS and the FEC so as to compensate for processing of the data stream by a data processor in the portion of the data path within the FEC.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

As mentioned above, Open Systems Interconnection (OSI) model characterizes and standardizes communications functions in networking applications. The OSI model, regardless of the networking technology, has several layers including: a physical layer, a data link layer, a network layer, a transport layer, a session layer, a presentation layer and an application layer. "Ethernet" refers to a family of networking technologies that are, for example, commonly used in local area networks (LANs) and metropolitan area networks (MANs). Different Ethernet networking technologies are defined by the rate (e.g., in Gigabits/second (Gb/s)) at which Ethernet frames are transmitted and these different Ethernet networking technologies are governed by different sub-sections under the Institute of Electrical and Electronics Engineers (IEEE) Standards 802. In any case, the different Ethernet networking technologies will have the same OSI model layers. That is, the OSI model layers referenced above will be present in each of the different Ethernet networking technologies. However, depending upon the Ethernet networking technology at issue, the architecture of a particular OSI model layer may vary and improvements (e.g., to reduce latency, costs and/or chip area consumed) are desirable.

Figure 1:
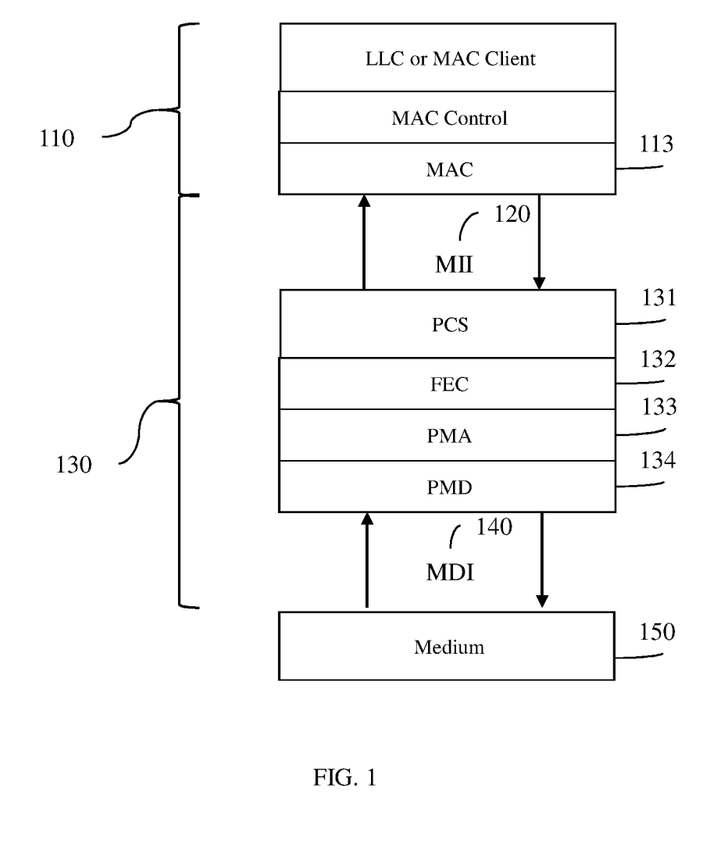
FIG. 1 is a schematic diagram illustrating multiple sub-layers of a physical layer device.

For example, the physical layer in any given Ethernet networking technology will include Ethernet physical layer device(s) that provide for the transmission and reception of bit streams over a physical medium (e.g., a transceiver or a transmitter and a receiver). As illustrated in FIG. 1, the physical layer device (PHYS) 130 will have multiple sub-layers including a physical coding sub-layer (PCS) 131, a forward error correction sub-layer (FEC) 132, a physical medium attachment sub-layer (PMA) 133 and a physical medium dependent sub-layer (PMD) 134. The PCS 131 is at the top of the physical layer 130 and can be linked through a media independent interface (MII) 120 to a media access control sub-layer (MAC) 113 of a data link layer 110. Within the PHYS 130, the PCS 131 can be linked through the FEC 132 to the PMA 133. The PMA 133 can further be linked to the PMD 134, which is in communication with a physical medium 150 through a medium dependent interface (MDI) 140.

Figure 2:
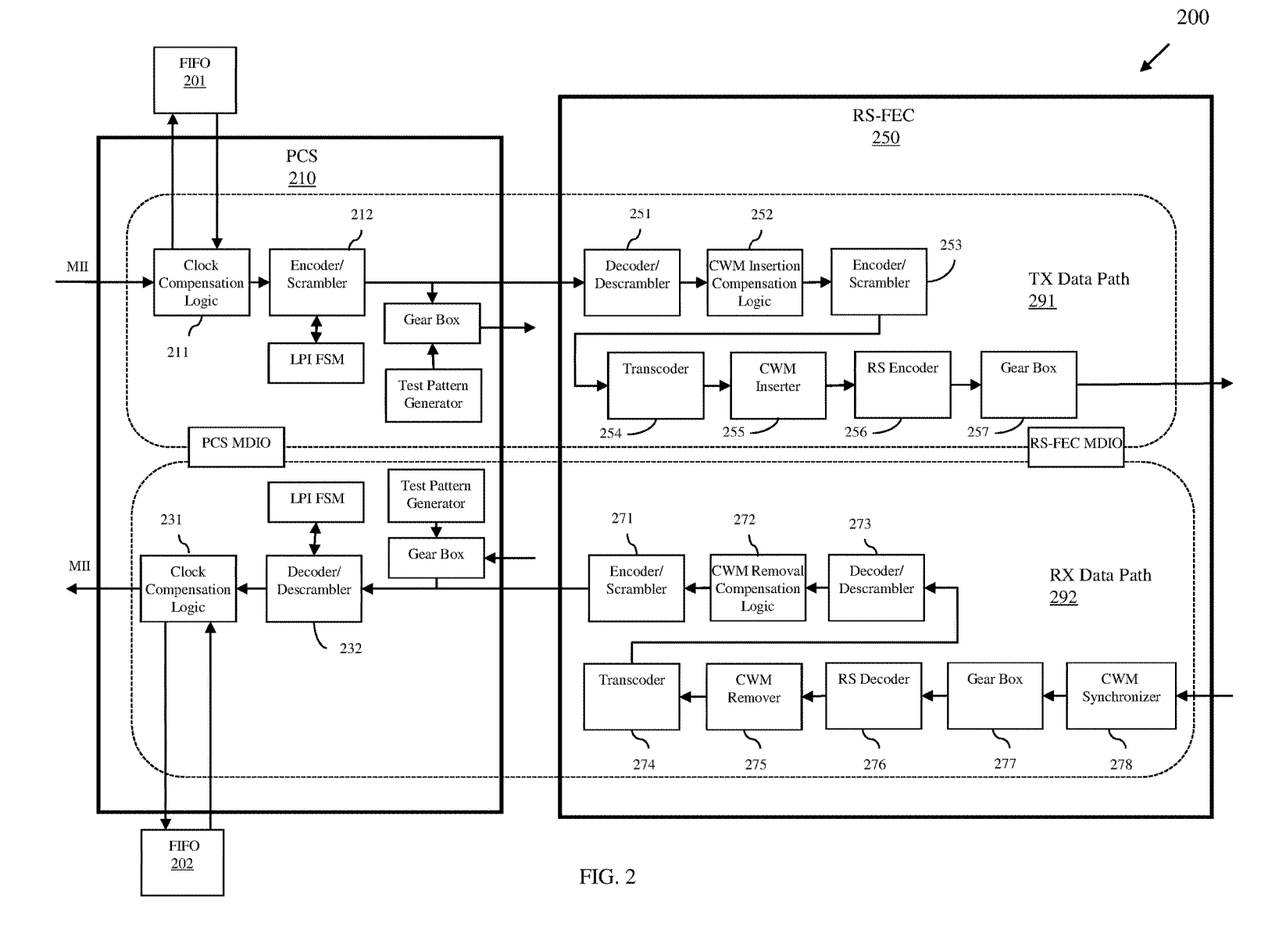
FIG. 2 is a schematic diagram illustrating discrete architectures for the physical coding and forward error correction sub-layers in a physical layer device.

FIG. 2 is a schematic diagram illustrating the exemplary architectures that can be used for the physical coding sub-layer (PCS) 210 and the forward error correction sub-layer (FEC) 250 in a portion 200 of a physical layer device and, particularly, in a portion of a physical layer transceiver in a 25 Gb/s Ethernet networking technology. The FEC 250 of the physical layer transceiver can be a Reed-Solomon (RS) FEC and, per the IEEE Standard 802.3byD3.2 for the 25 Gb/s Ethernet networking technology, the FEC 250 can include a code word mark (CWM) inserter 255 within the transmitter (TX) data path 291. The CWM inserter 255 can insert CWMs into the TX data stream that passes through the portion of the TX data path 291 within the FEC 250 in order to detect data packets boundaries. This FEC 250 can also include a code word mark (CWM) remover 275 within the receiver (RX) data path 292. The CWM remover 275 can remove CWMs from the RX data stream that passes through the portion of the RX data path 292 with the FEC 250. In this case, additional components are also included in the FEC 250 to allow for proper CWM insertion and removal and to compensate for the overhead caused by the CWM insertion and removal.

More specifically, a TX data stream, transmitted from a clock domain of a MAC of a data link layer to the clock domain of the PCS 210, enters the portion of the TX data path 291 within the PCS 210. The portion of the TX data path 291 within the PCS 210 can include at least TX clock compensation logic 211 and an encoder and scrambler 212 (e.g., a 64b/66b encoder and scrambler). The TX clock compensation logic 211 in combination with external first in first out (FIFO) logic 201 can process the TX data stream to compensate for frequency variations between the MAC and PCS clock domains. The encoder and scrambler 212 can then encode the TX data stream to improve transmission characteristics and scramble the TX data stream. Following encoding and scrambling, the TX data stream, which has, for example, frames with a 66b width, can be output to the portion of the TX data path 291 within the FEC 250.

The portion of the TX data path 291 within the FEC 250, which receives the TX data stream from the PCS 210, can include standard FEC components. For example, this portion of the TX data path 291 can include a transcoder 254 (e.g., a 256/257 transcode & 4×66/264 GB), a Reed-Solomon (RS) encoder 256, and gear box 257 (e.g., a 260/32 gear box). However, as mentioned above, this portion of the TX data path 291 can also include a CWM inserter 255 and additional components used to compensate for the overhead caused by the CWM insertion. Specifically, the portion of the TX data path 291 within the FEC 250 can also include a decoder and descrambler 251, CWM insertion compensation logic 252, an encoder and scrambler 253 and the CWM inserter 255. The decoder and descrambler 251 can decode and descramble the TX data stream received from the encoder and scrambler 212 of the PCS 210 so as to allow the TX data stream to be processed by the CWM compensation logic 252. The CWM insertion compensation logic 252 can delay (or halt) the TX data stream for a given number of clock cycles, as necessary, to compensate for CWM insertion being performed by the CWM inserter 255 downstream. Following processing by the CWM insertion compensation logic 252, the encoder and scrambler 253 can again encode and scramble the TX data stream. Once the TX data stream is again encoded and descrambled, it can be transcoded by the transcoder 254. During transcoding multiple blocks of bits (e.g., 4 66-bit blocks) can, for example, be converted into a single block of bits (e.g., a single 257-bit block). CWMs are then inserted into the TX data stream by the CWM inserter 255, encoding can then be performed by the RS encoder 256 to generate 140-bit parity check for error correction on RX-side and the resulting stream can be gear boxed by the gear box 257 for output to a PMA. Those skilled in the art will recognize that a gear box is a logic function or device that uses multiplexing, de-multiplexing and/or shifting operations to map a data stream from an output of one layer to an input of another (or vice versa), where the input and output lane widths and line rates are not evenly divisible. Thus, for example, the TX data stream that is output from the gear box 257 to the portion of the TX data path 291 within the PMA can have frames having a 32b width.

In the same physical layer device, an RX data stream (e.g., with frames having a 32b width) can be received from a PMA by a portion of an RX data path 292 within the FEC 250.

This portion of the RX data path 292 within the FEC 250 can include standard FEC components. For example, this portion of the RX data path 292 can include a CWM synchronizer 278, a gear box 277 (e.g., a 32/280 gear box), a Reed-Solomon (RS) decoder 276, and a transcoder 274 (e.g., a 256/257 transcode &264/4×66 GB). As mentioned above, this portion of the RX data path 292 can also include a CWM remover 275 and additional components that compensate for the overhead caused by the CWM removal. Specifically, this portion of the RX data path 292 within the FEC 250 can also include the CWM remover 275, a decoder and descrambler 273, CWM removal compensation logic 272, and an encoder and scrambler 271. The CWM synchronizer 278 can receive the RX data stream from the PMA and can identify CWM from data stream to make received data aligned with 5280-bits code word (in a process referred to herein as synchronizing). The gear box 277 can gear box the received RX data stream (e.g., so that it has frames with a 66b width). The RS decoder 276 can decode the RX data stream to provide symbol error correction. The CWM remover 275 can remove any CWMs from the RS-side data stream and, after removal of the CWMs from the RX data stream, the transcoder 274 can transcode the RX data stream. During transcoding a single block of bits (e.g., a single 257-bit block) can, for example, be converted into multiple blocks of bits (e.g., 4 66-bit blocks). Thus, at this point, the RX data stream will have frames with a 66-bit width). The decoder and descrambler 273 can then decode and descramble the RX data stream so as to allow the RX data stream to be processed by the CWM removal compensation logic 2572. The CWM removal compensation logic 272 can delay (or halt) the RX data stream for a given number of clock cycles, as necessary, to compensate for CWM removal being performed by the CWM remover 275 upstream. Following processing by the CWM removal compensation logic 272, the encoder and scrambler 271 can again encode and scramble the RX data stream. Once the RX data stream is again encoded and descrambled, it can be output to a portion of RX data path 292 with the PCS 210.

The portion of the RX data path 292 within the PCS 210, which receives the RX data stream from the encoder and scrambler 271 of the FEC 250, can include at least a decoder and descrambler 232 (e.g., a 64b/66b decoder and descrambler) and RX clock compensation logic 231. The decoder and descrambler 232 can decode and descramble the RS-side data stream. Then, the RX clock compensation logic 231 in combination with external first in first out (FIFO) logic 202 can process the RX data stream to compensate for frequency variations between the clock domain of the PCS and the clock domain of the MAC of the data link layer to which the RX data stream is output.

In the present invention, the architectures of the PCS and FEC within a physical layer device are improved upon and, particularly, integrated in order to reduce latency, costs and/or chip area consumed. Specifically, disclosed herein are Ethernet physical layer devices (e.g., a transceiver, a receiver and a transmitter) with integrated physical coding and forward error correction sub-layers. Each physical layer device can include a physical coding sub-layer (PCS), a forward error correction sub-layer (FEC) and integration block(s). Each integration block can halt, for some number of clock cycles, a data stream in portions of a data path (e.g., portions of a transmitter (TX) data path or portions a receiver (RX) data path) within the PCS and the FEC in order to compensate for processing of that data stream by a data processor (e.g., a code word mark (CWM) inserter or a CWM remover) contained in the portion of the data path within the FEC. Use of such integration block(s) eliminates the need for redundant components in the PCS and FEC, thereby reducing latency, costs and chip area consumption. Also disclosed herein are associated methods.

In the embodiments disclosed herein the Ethernet physical layer device can be, for example, a transceiver. Alternatively, the Ethernet physical layer device could be a discrete transmitter or a discrete receiver. In any case, the Ethernet physical layer device will have multiple sub-layers including a physical coding sub-layer (PCS), a forward error correction sub-layer (FEC), a physical medium attachment sub-layer (PMA) and a physical medium dependent sub-layer (PMD).

Figure 3:
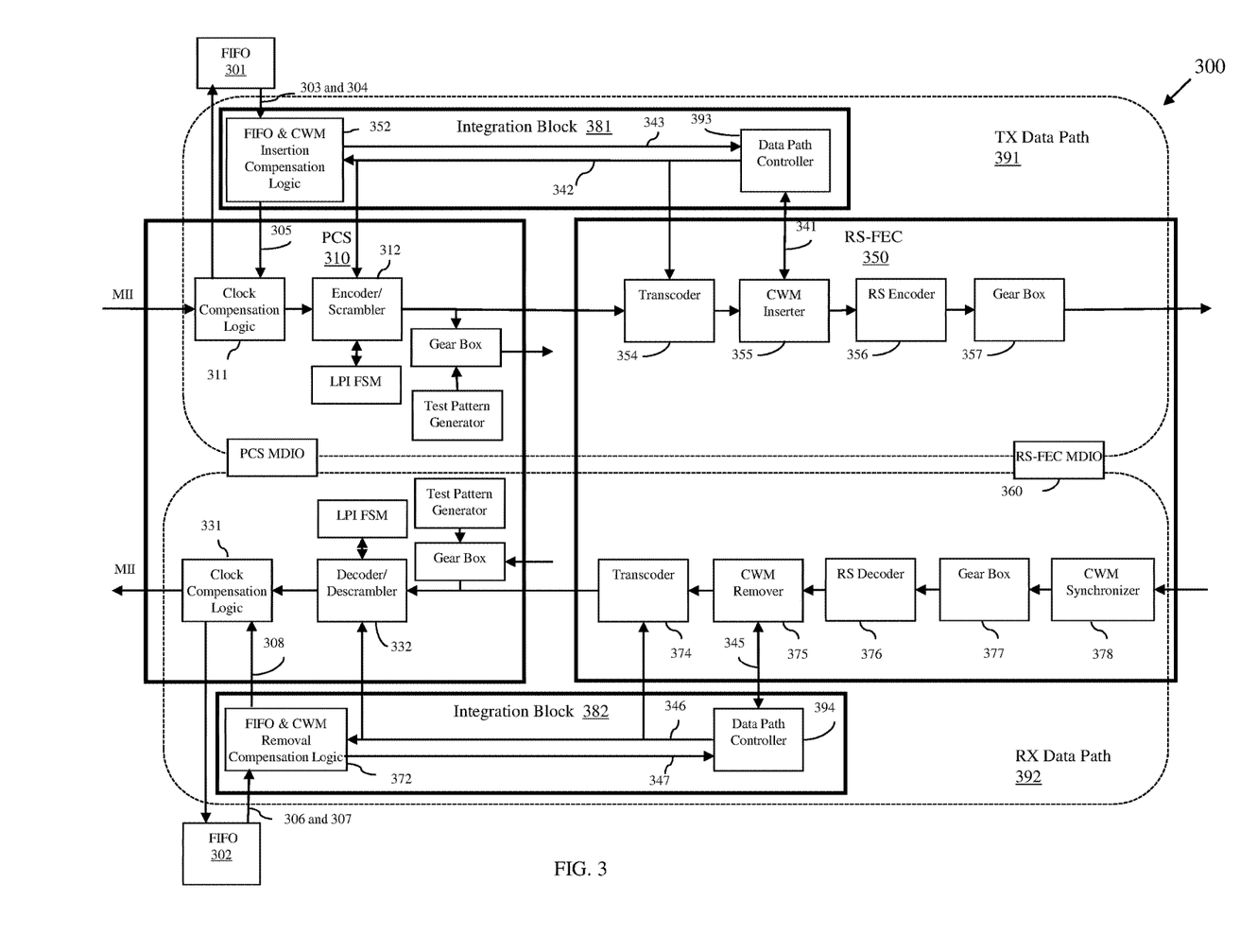
FIG. 3 is a schematic diagram illustrating integrated architectures for the physical coding and forward error correction sub-layers in a physical layer device.

FIG. 3 is a schematic diagram illustrating integrated architectures that can be used for the physical coding sub-layer (PCS) 310 and the forward error correction sub-layer (FEC) 350 in a portion 300 of a physical layer device in a 25 Gb/s Ethernet networking technology. For purposes of illustration, the physical layer device shown is a transceiver with a transmitter (TX) side and a receiver (RX) side. It should be understood that, alternatively, the TX and the RX could be discrete components. In any case, this portion 300 of the physical layer device can include the PCS 310 and the FEC 350. One or more data paths (e.g., a TX data path 391 and/or a RX data path 392) can extend across the PCS 310 and the FEC 350. This portion 300 of the physical layer device can further have one or more integration blocks 381-382 for integrating the PCS 310 and the FEC 350. It should be understood that the number of integration blocks will correspond to the number of data paths and will depend upon whether the device is a transmitter, receiver, or transceiver.

Each integration block 381 or 382 can be in communication with and operably connected to the PCS and the FEC. Specifically, each integration block 381 or 382 can be in communication with a data processor in a portion of a data path within the FEC 350 and can halt, for some number of clock cycles, a data stream in the portions of the data path 391 or 392 within PCS 310 and the FEC 350 so as to compensate for processing of the data stream by the data processor. For example, in the case of a transmitter (TX) or the TX-side of a transceiver, an integration block 381 can be in communication with a data processor and, particularly, a code word mark (CWM) inserter 355 in a portion of the TX data path 391 within the FEC 350 and can halt, for some number of clock cycles, a TX data stream in the portions of the TX data path 391 in order to compensate for processing of the TX data stream (i.e., for insertion of CWMs into the TX data stream) by the CWM inserter 355. In the case of a receiver (RX) or the RX-side of a transceiver, an integration block 382 can be in communication with a data processor and, particularly, a CWM remover 375 in a portion of the RX data path 392 within the FEC 350 and can halt, for some number of clock cycles, an RX data stream in portions of the RX data path 392 within both the PCS 310 and the FEC 350 in order to compensate for processing of the RX data stream (i.e., for removal of CWMs from the RX data stream) by the CWM remover 375.

More specifically, referring to FIG. 3, the FEC 350 can be a Reed-Solomon FEC and can include a code word mark (CWM) inserter 355 within the TX data path 391. In order to detect data packets boundaries, the CWM inserter 355 can insert CWMs into the TX data stream that passes through the portion of the TX data path 391 within the FEC 350. This FEC 350 can also include a code word mark (CWM) remover 375 within the RX data path 392. The CWM remover 375 can remove CWMs from the RX data stream that passes through the portion of the RX data path 392 with the FEC 350. As discussed in greater detail below, compensation for the overhead caused by the CWM insertion and removal is provided by the integration blocks 381 and 382 and not by incorporating additional components (e.g., see additional components 251, 252 and 253, discussed above) into the FEC 350.

On the TX-side of the transceiver (or, if applicable, in a transmitter), a TX data stream, which is transmitted from a clock domain of a MAC of a data link layer to the clock domain of the PCS 310, enters the portion of the TX data path 391 within the PCS 310. The portion of the TX data path 391 within the PCS 310 can include at least TX clock compensation logic 311 and an encoder and scrambler 312 (e.g., a 64b/66b encoder and scrambler). The TX clock compensation logic 311 in combination with external first in first out (FIFO) logic 301 can process the TX data stream received from the MAC in order to compensate for frequency variations between the MAC and PCS clock domains. The encoder and scrambler 312 can then encode the TX data stream to improve transmission characteristics and scramble the TX data stream. Following encoding and scrambling, the TX data stream, which has, for example, frames with a 66b width, can be output to the portion of the TX data path 391 within the FEC 350.

The portion of the TX data path 391 within the FEC 350 can include a transcoder 354 (e.g., a 256/257 transcode & 4×66/264 GB), a CWM inserter 355, a Reed-Solomon (RS) encoder 356, and gear box 357 (e.g., a 260/32 gear box). The TX data stream can be received by the transcoder 354 in the FEC 350 from the encoder and scrambler 312 in the PCS 310. The transcoder 354 can transcode the TX data stream. During transcoding multiple blocks of bits (e.g., 4 66-bit blocks) can, for example, be converted into a single block of bits (e.g., a single 257-bit block). CWMs can then be inserted into the TX data stream by the CWM inserter 355, encoding can be performed by the RS encoder 356 to generate 140-bit parity check for error correction on RX-side, and gear boxing can be performed by the gear box 357 prior to output of the TX data stream to a PMA. As mentioned above, a gear box is a logic function or device that uses multiplexing, de-multiplexing and/or shifting operations to map a data stream from an output of one layer to an input of another (or vice versa), where the input and output lane widths and line rates are not evenly divisible. Thus, for example, the TX data stream that is output from the gear box 357 to the PMA can have frames with a 32b width.

As mentioned above, compensation for the CWM insertion by the CWM inserter 355 of the FEC 350 is not provided by adding components to the FEC 350. Instead components within the integration block 381 cause the TX data stream within the portions of the TX data path 391 in both the PCS 310 and the FEC 350 to be halted for a first number of clock cycles and, particularly, a sufficient number of clock to compensate for the CWM insertion by the CWM inserter 355 in the portion of the TX data path 391 within the FEC 350. Specifically, the integration block 381 can include CWM insertion compensation logic 352, which is operably connected to the TX clock compensation logic 311 and also in communication with external FIFO control logic 301. The integration block 381 can further include a TX data path controller 393 that is in communication with and operably connected to the CWM insertion compensation logic 352, the CWM inserter 355 and other transmitter components in the TX data path 391 in both the PCS 310 and the FEC 350, including the transcoder 354 within the FEC 350 and the encoder and scrambler 312 within the PCS 310.

Figure 4:
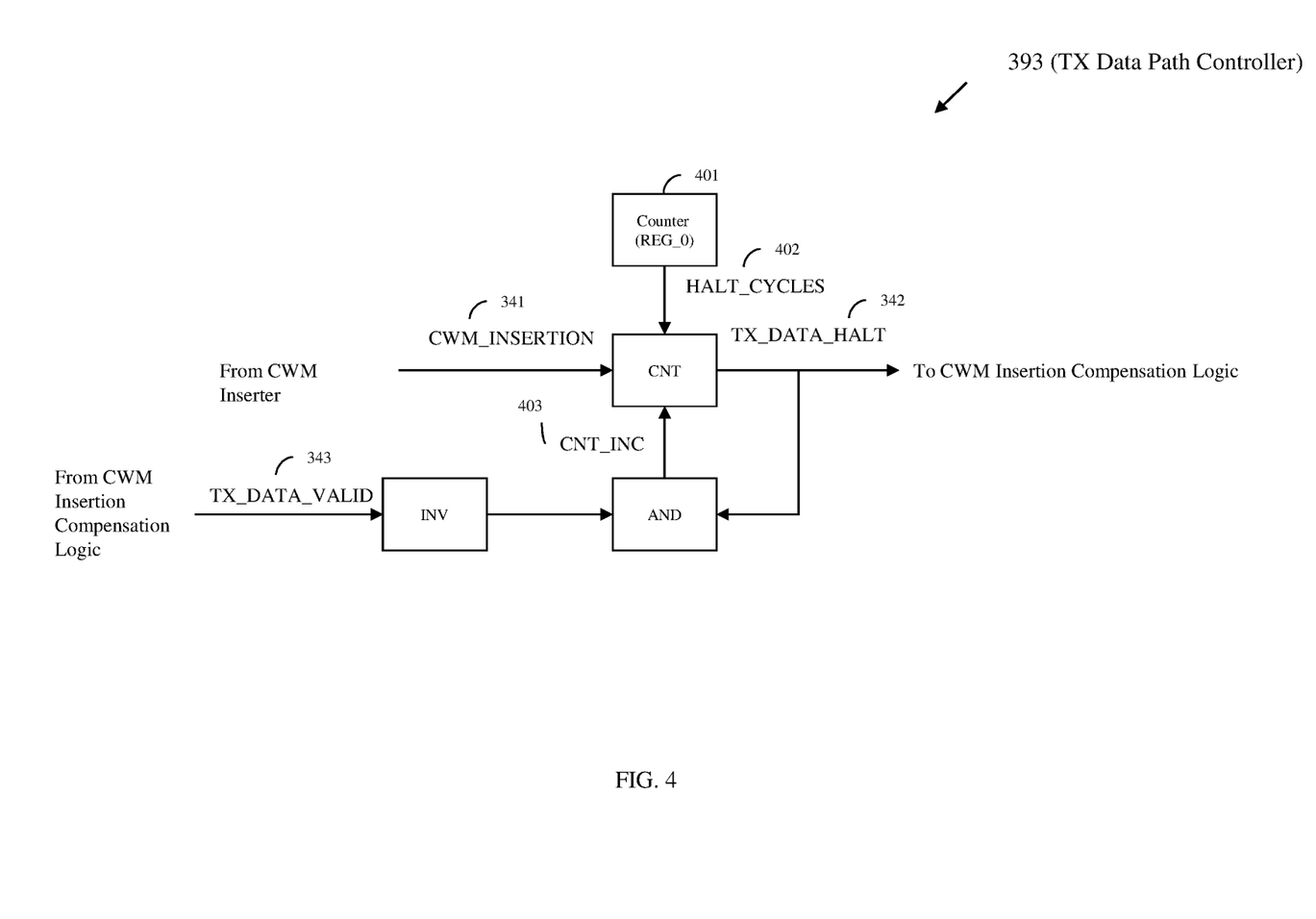
FIG. 4 is a schematic diagram illustrating an exemplary TX data path controller.

FIG. 4 is a schematic diagram illustrating an exemplary TX data path controller 393 that can be incorporated into the integration block 381 of FIG. 3. Referring to FIG. 4 in combination with FIG. 3, in operation, the TX data path controller 393 can receive a CWM_INSERTION signal 341 from the CWM inserter 355. This CWM_INSERTION signal 341 can indicate a CWM pattern has been inserted into the TX data stream. Based on the CWM_INSERTION signal 341, the TX data path controller 393 can determine the number of clock cycles during which the TX data stream should be halted. Specifically, TX data path controller 393 can include a counter 401 (i.e., a register (REG_0)). This counter 401 can, for example, be set by a management data input/output (MDIO) within the FEC 350 (see RS-FEC MDIO 360) and, in response to the CWM_INSERTION signal 341 can count the number of cycles that the data stream should be halted in order to compensate for the CWM insertion (see HALT_CYCLES signal 402). The TX data path controller 393 can then generate and transmit, to the CWM insertion compensation logic 352, to the encoder and scrambler 312 and to the transcoder 354, a TX_DATA_HALT signal 342, which indicates this number of clock cycles. Upon receipt of the TX_DATA_HALT signal 342 and, in response to that signal, the CWM insertion compensation logic 352, the encoder and scrambler 312 and the transcoder 354 will each halt all of their respective logic operations for the number of clock cycles indicated. Thus, the TX data stream is halted in the portions of the TX data path 391 in both the PCS 310 and FEC 350, thereby compensating for the processing time required for insertion of the CWMs into the TX data stream by the CWM inserter 355.

In addition to the components described above, the TX data path controller 393 can further include components that allow the number of cycles indicated by the TX_DATA_HALT signal 342 to be increased over the count set by the counter 401 (i.e., over the HALT_CYCLES signal 402), if necessary. For example, a TX_DATA_VALID signal 343 can also be received by the TX data path controller 393 from the CWM insertion compensation logic 352. This TX_DATA_VALID signal 343 will indicate if a TX data out control signal 305, discussed in greater detail below, is valid or not. If the de-assertion of the TX_DATA_VALID 343 is overlapped with the assertion of the TX_DATA_HALT signal 342, compensation of one more cycle of assertion of TX_DATA_HALT signal 342 becomes necessary and a CNT_INC signal 403 is used to indicate the necessary increase in the number of cycles.

Figure 5:
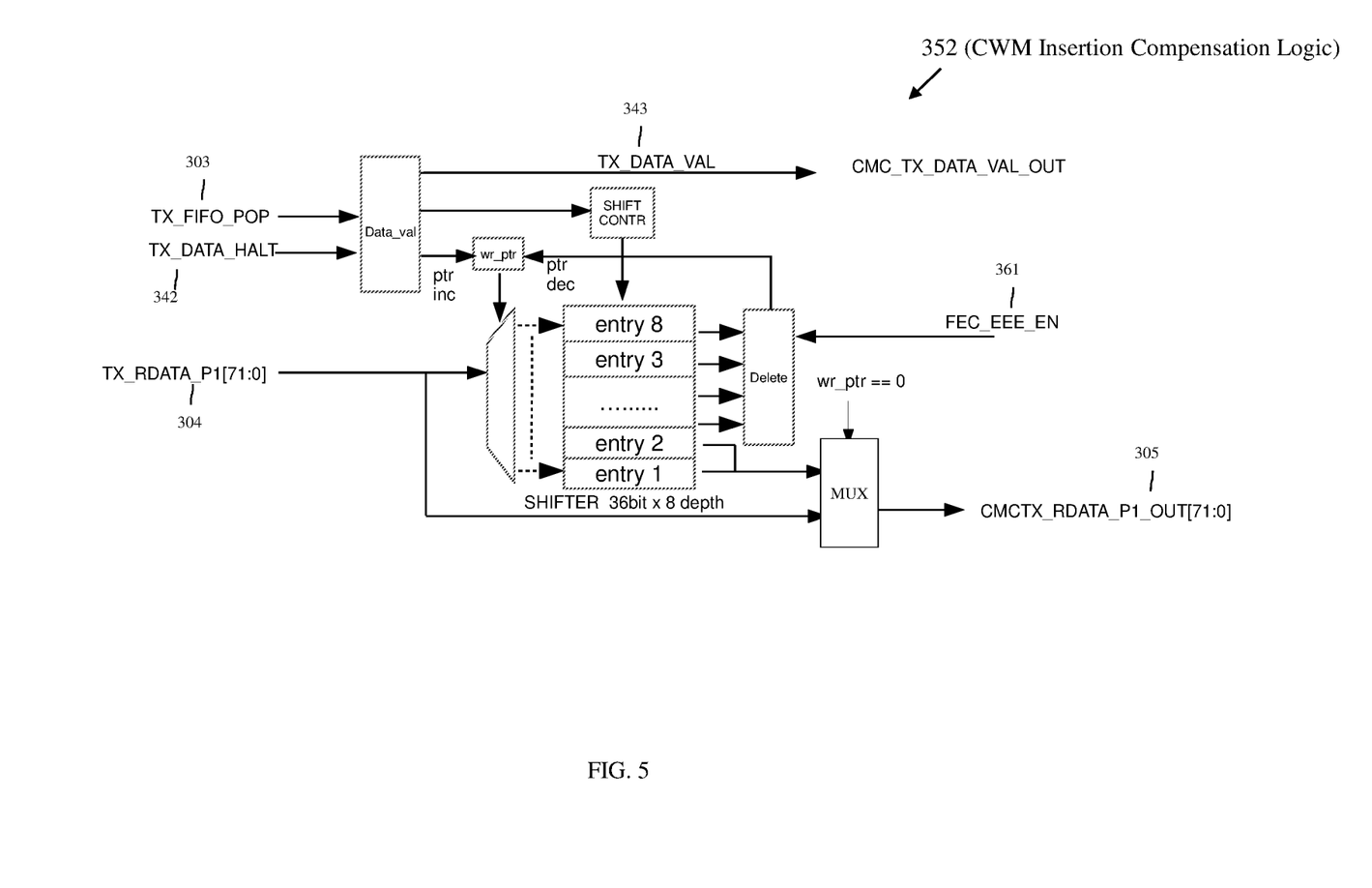
FIG. 5 is a schematic diagram illustrating exemplary CWM insertion compensation logic.

FIG. 5 is a schematic diagram illustrating exemplary CWM insertion compensation logic 352 that can be incorporated into the integration block 381 of FIG. 3. Referring to FIG. 5 in combination with FIGS. 3 and 4, in operation, the CWM insertion compensation logic 352 can receive the TX_DATA_HALT signal 342 from the TX data path controller 393 as well as signals 303-304 from the external TX FIFO control logic 301. Based on the TX_DATA_HALT signal 342 and the signals 303-304, the CWM insertion compensation logic 352 can generate and transmit, to the TX clock compensation logic 311, a TX data out control signal 305. This TX data out control signal 305 can cause the TX clock compensation logic 311 to compensate for the frequency variations between the MAC and PCS clock domains, as necessary, when the CWM insertion compensation logic 352 is not frozen. More specifically, the CWM insertion compensation logic 352 can include, for example, a 36 bit×8 depth FIFO, and other control logic. A TX_FIFO_POP signal 303 and a TX_RDATA_P1[71:0] signal 304 can be received by the CWM insertion compensation logic 352 from the external FIFO control logic 301. Furthermore, the TX_DATA_HALT signal 342 can be received by the CWM insertion compensation logic 352 from the TX data path controller 393 to indicate if CWM is inserted into data stream. Within the CWM insertion compensation logic 352, a "Delete" block can be used to determine whether any idle words can be deleted to compensate the rate deviation caused by CWM insertion. A "wr_ptr" block and a "shift contr" can be used to manage the pointers of FIFO. A "Data_val" block can be used to generate the TX_DATA_VALID signal 343. The TX_DATA_VALID signal 343 can be used to indicate if the TX data out control signal 305 (i.e., CMC_TX_RDATA_P1_OUT[71:0]) is valid or not and can be output to the TX data path controller 393. In operation, if an FEC_EEE_EN signal 361 to the "Delete" block is asserted, then low power idle word can also be deleted to provide rate compensation. The outputs of the CWM insertion compensation logic 352 can include the TX data out control signal 305 (i.e., CMC_TX_RDATA_P1 OUT[71:0]) and a CMC_TX_DATA_VAL_OUT signal 362, which control the TX clock compensation logic 311.

On the RX-side of the transceiver (or, if applicable, in a receiver), an RX data stream (e.g., with frames having a 32b width) can be received from a PMA by a portion of an RX data path 392 within the FEC 350. The portion of the RX data path 392 within the FEC 350 can include a CWM synchronizer 378, a gear box 377 (e.g., a 32/280 gear box), a Reed-Solomon (RS) decoder 376, a CWM remover 375 and a transcoder 374 (e.g., a 256/257 transcode &264/4×66 GB). The CWM synchronizer 378 can receive the RX data stream from the PMA and can identify CWM from data stream to make received data aligned with 5280-bits code word (in a process referred to herein as synchronizing). The gear box 377 can gear box the received RX data stream (e.g., so that it has frames with a 66b width). The RS decoder 376 can decode the RX data stream to provide symbol error correction. The CWM remover 375 can remove any CWMs from the RX data stream and, after removal of the CWMs from the RX data stream, the transcoder 374 can transcode the RX data stream. During transcoding a single block of bits (e.g., a single 257-bit block) can, for example, be converted into multiple blocks of bits (e.g., 4 66-bit blocks). Thus, at this point, the RX data stream will have frames with a 66-bit width.

The portion of the RX data path 392 within the PCS 310, which receives the RX data stream from the transcoder 374 of the FEC 350, can include at least a decoder and descrambler 332 (e.g., a 64b/66b decoder and descrambler) and RX clock compensation logic 331. The decoder and descrambler 332 can decode and descramble the RS-side data stream. Then, the RX clock compensation logic 331 can, in combination with external first in first out (FIFO) logic 302, process the RX data stream to compensate for frequency variations between the clock domain of the PCS 310 and the clock domain of the MAC of the data link layer to which the RX data stream is output.

Compensation for the CWM removal by the CWM remover 375 is not provided by adding components to the FEC 350. Instead components within the integration block 382 cause the RX data stream within the portions of the RX data path 392 in both the PCS 310 and the FEC 350 to be halted for a second number of clock cycles and, particularly, a sufficient number of clock to compensate for the CWM removal by the CWM remover 375 in the portion of the RX data path 392 within the FEC 350. Specifically, the integration block 382 can include CWM removal compensation logic 372, which is operably connected to the RX clock compensation logic 331 and also in communication with external FIFO control logic 302. The integration block 382 can further include an RX data path controller 394 that is in communication with and operably connected to the CWM removal compensation logic 372, the CWM remover 375, and other receiver components in the RX data path 392 in both the PCS 310 and the FEC 350, including the transcoder 374 within the FEC 350 and the decoder and descrambler 332 within the PCS 310.

Figure 6:
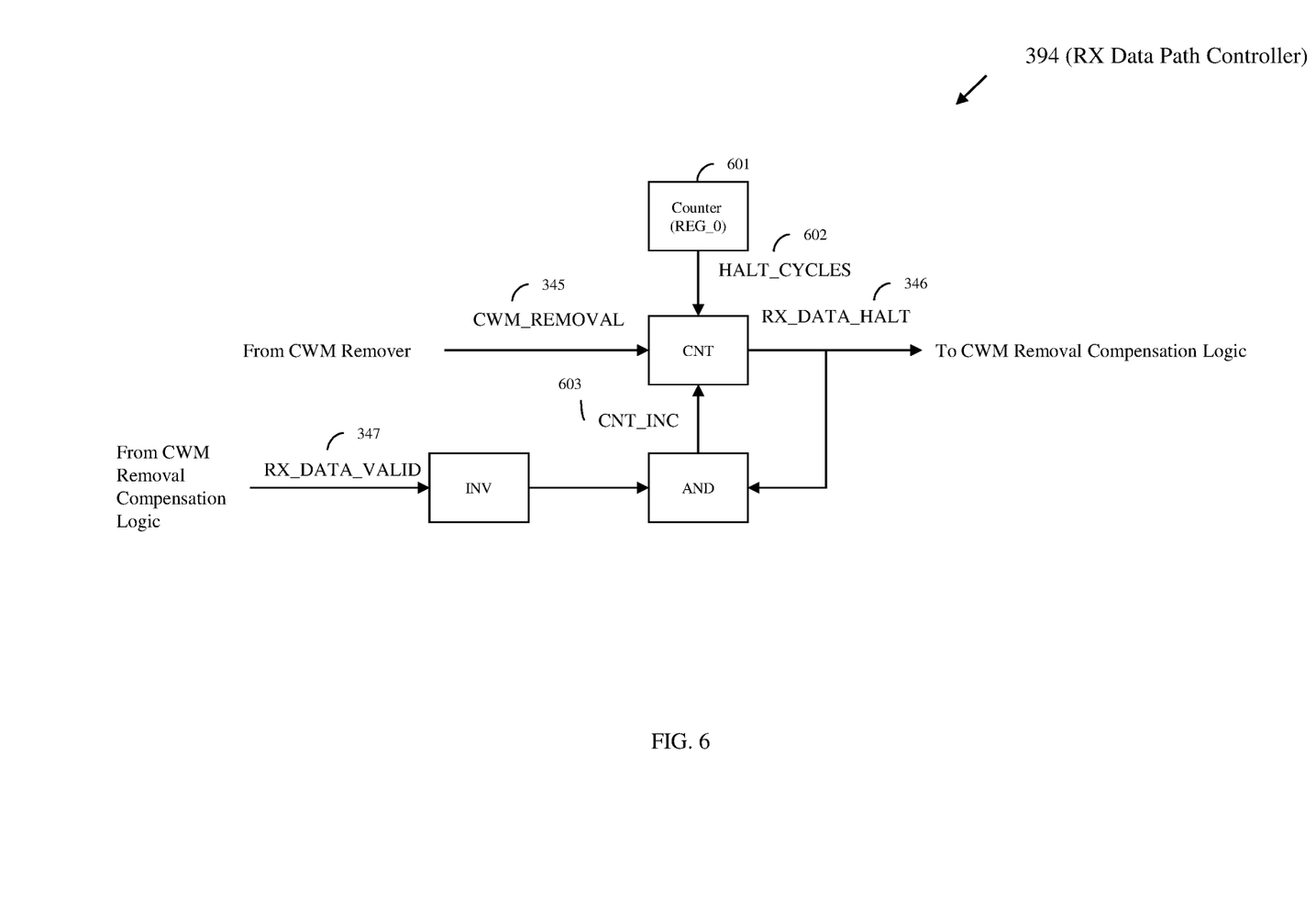
FIG. 6 is a schematic diagram illustrating an exemplary RX data path controller.

FIG. 6 is a schematic diagram illustrating an exemplary RX data path controller 394 that can be incorporated into the integration block 382 of FIG. 3. Referring to FIG. 6 in combination with FIG. 3, in operation, the RX data path controller 394 can receive a CWM_REMOVAL signal 345 from the CWM remover 375. This CWM_REMOVAL signal 345 can indicate a CWM pattern has been removed from the RX data stream. Based on the CWM_REMOVAL signal 345, the RX data path controller 394 can determine the number of clock cycles during which the RX data stream should be halted. Specifically, RX data path controller 394 can include a counter 601 (i.e., a register (REG_0)). This counter 601 can, for example, be set by the management data input/output (MDIO) within the FEC 350 (see RS-FEC MDIO 360) and, in response to the CWM_REMOVAL signal 345, can count the number of cycles that the data stream should be halted in order to compensate for the CWM removal (see HALT_CYCLES signal 602). The RX data path controller 394 can then generate and transmit, to the CWM removal compensation logic 372, to the decoder and descrambler 332 and to the transcoder 374, an RX_DATA_HALT signal 346, which indicates this number of clock cycles. Upon receipt of the RX-DATA-HALT signal 346 and, in response to that signal, the CWM removal compensation logic 372, the decoder and descrambler 332 and the transcoder 374 will each halt all of their respective logic operations for the number of clock cycles indicated. Thus, the RX data stream is halted in the portions of the RX data path 392 in both the PCS 310 and FEC 350, thereby compensating for the processing time required for removal of the CWMs from the RX data stream by the CWM remover 375.

In addition to the components described above, the RX data path controller 394 can further include additional components that allow the number of cycles indicated by the RX_DATA_HALT signal 345 to be increased over the count set by the counter 601 (i.e., over the HALT_CYCLES signal 602), if necessary. For example, an RX_DATA_VALID signal 347 can also be received by the RX data path controller 394 from the CWM removal compensation logic 372. This RX_DATA_VALID signal 347 will indicate if an RX data out control signal 308, discussed in greater detail below, is valid or not. If the de-assertion of the RX_DATA_VALID signal 347 is overlapped with the assertion of the RX_DATA_HALT signal 345, compensation of one more cycle of assertion of RX_DATA_HALT signal 345 becomes necessary and a CNT_INC signal 603 is used to indicate the necessary increase in the number of cycles.

Figure 7:
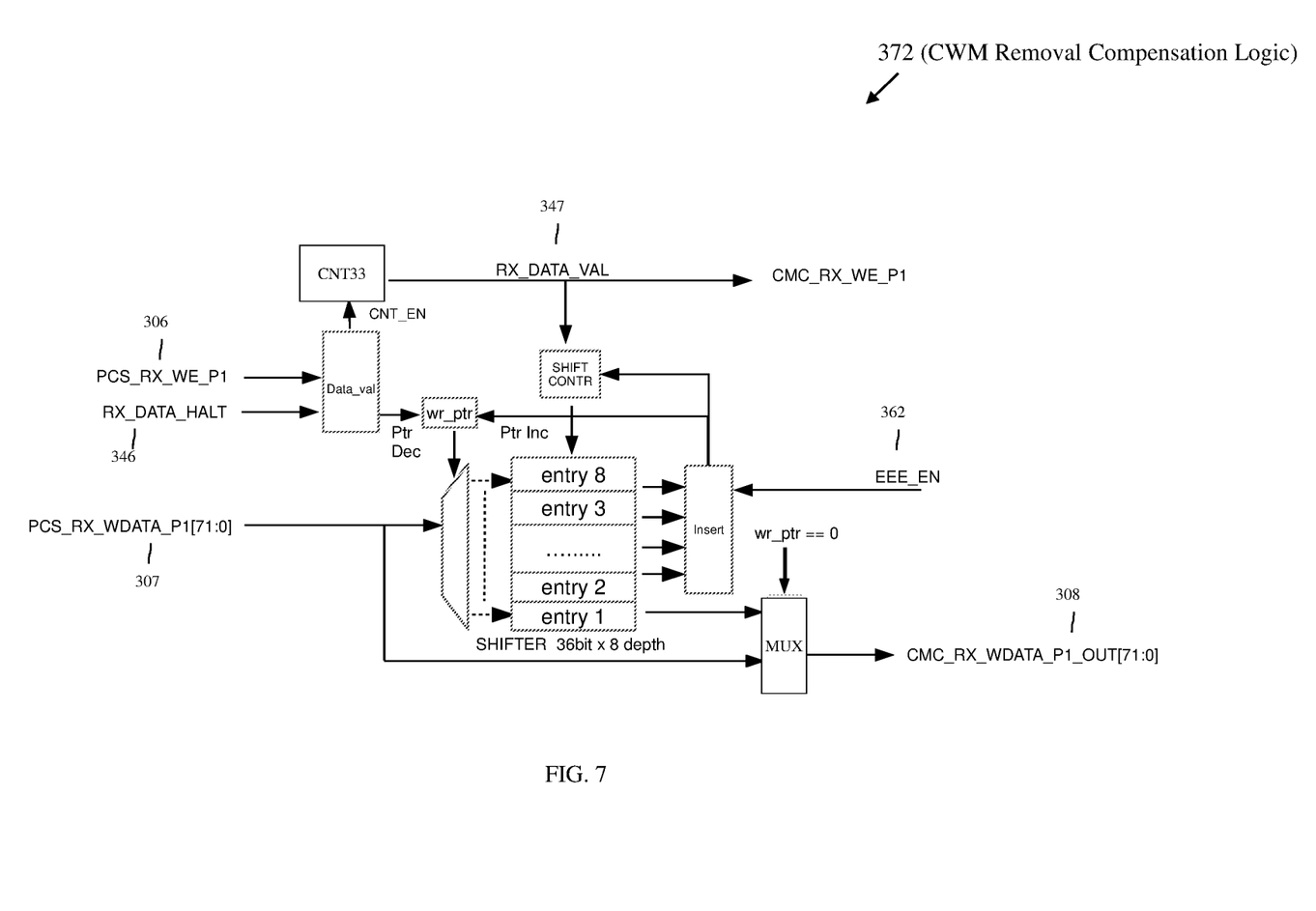
FIG. 7 is a schematic diagram illustrating exemplary CWM removal compensation logic.

FIG. 7 is a schematic diagram illustrating exemplary CWM removal compensation logic 372 that can be incorporated into the integration block 382 of FIG. 3. Referring to FIG. 7 in combination with FIGS. 3 and 6, in operation, the CWM removal compensation logic 372 can receive the RX_DATA_HALT signal 345 from the RX data path controller 394 as well as signals 306-307 from the external RX FIFO control logic 302. Based on the RX_DATA_HALT signal 345 and the signals 306-307, the CWM removal compensation logic 372 can generate and transmit, to the RX clock compensation logic 331, an RX data out control signal

308 (i.e., CMC_RX_WDATA_P1_OUT[71:0]). This RX data out control signal 308 can cause the RX clock compensation logic 331 to compensate for the frequency variations between the MAC and PCS clock domains, as necessary, when the CWM removal compensation logic 372 is not frozen. More specifically, the CWM removal compensation logic 372 can also include, for example, a 36 bit×8 depth FIFO and other control logic. A PCS_RX_WE_P1 signal 306 and a PCS_RX_WDATA_P1[71:0] signal 307 can be received by the CWM removal compensation logic 372 from the external FIFO control logic 302. Furthermore, the RX_DATA_HALT signal 345 can be received by the CWM removal compensation logic 372 from the RX data path controller 394. The RX_DATA_HALT signal 346 can indicate that CWM(s) have been removed from the data stream by CWM remover 375. Within the CWM removal compensation logic 352, an "Insert" block can be used to determine whether any idle words can be inserted to compensate the rate deviation caused by CWM removal. A "wr_ptr" block and a "shift contr" can be used to manage the pointers of FIFO. A "Data_val" block can be used to generate the RX_DATA_VALID signal 347, which is output to the RX data path controller 394. The RX_DATA_VALID signal 347 can be used to indicate if the RX data out control signal 308 (i.e., CMC_RX_WDATA_P1_OUT[71:0]) is valid or not. In operation, if the EEE_EN signal 362 to the "Insert" block is asserted, then low power idle word can also be inserted to provide rate compensation. The outputs of the CWM removal compensation logic 372 can include the RX data out control signal 308 (i.e., CMC_RX_WDATA_P1_OUT [71:0]) and a CMC_RX_WE_P1 signal, which control the RX clock compensation logic 331 within the PCS 310 to ensure that the RX data stream is halted (i.e., delayed), as needed.

Also disclosed herein are embodiments of a method of operating an Ethernet physical layer device (e.g., a transceiver, a transmitter (TX) or a receiver (RX)). Referring to the flow diagram of FIG. 8, in the method an Ethernet physical layer device can be provided (801). For example, as discussed in detail above, the Ethernet physical layer device can be a transmitter, a receiver or a transceiver (e.g., as illustrated in FIG. 3). Specifically, this physical layer device can have multiple components including, but not limited to, a physical coding sub-layer (PCS) 310, a forward error correction sub-layer (FEC) 350, and at least one integration block 381 and/or 382 that is in communication with and operably connected to both the PCS 310 and the FEC 350 and, thereby integrates the PCS 310 and the FEC 350.

Figure 8:
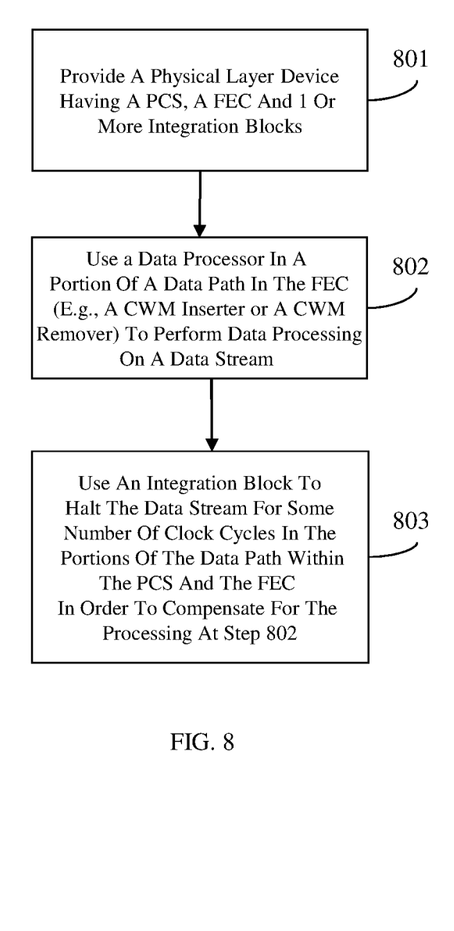
FIG. 8 is a flow diagram illustrating a method of operating a physical layer device.

In the method, data processing can be performed on a data stream in a portion of a data path with the FEC 350. For example, in the case of a TX or the TX-side of a transceiver, code word marks (CWMs) can be inserted into a TX data stream by a code word mark (CWM) inserter 355 in a portion of a TX data path 391 within the FEC 350. In the case of an RX or the RX-side of a transceiver, CWMs can be removed from an RX data stream by a CWM remover 375 in a portion of an RX data path 392 within the FEC 350.

The method can further include using an integration block to halt the data stream for some number of cycles in the portions of the data path within the PCS and the FEC in order to compensate for the processing performed at step 802 (803). For example, in the case of a TX or the TX-side of a transceiver, an integration block 381 can be in communication the code word mark (CWM) inserter 355 in the portion of the TX data path 391 within the FEC 350 and can halt the TX data stream for some number of cycles in the portions of the TX data path 391 within the PCS 310 and the FEC 350 in order to compensate for insertion of CWMs into the TX data stream by the CWM inserter 355. In the case of an RX or the RX-side of a transceiver, an integration block 382 can be in communication with the CWM remover 375 in the portion of the RX data path 392 within the FEC 350 and can halt the RX data stream for some number of cycles in the portions of the RX data path 392 within the PCS 310 and the FEC 350 in order to compensate for removal of CWMs from the RX data stream by the CWM remover 375.

More specifically, on the TX-side of the transceiver (or, if applicable, in a TX), a TX data stream, which is transmitted from a clock domain of a MAC of a data link layer to the clock domain of the PCS 310, can enter the portion of the TX data path 391 within the PCS 310. This TX data stream can, within the PCS 310, be subjected to frequency compensation (e.g., by TX clock compensation logic) and encoding and scrambling (e.g., by an encoder and scrambler 312). Following encoding and scrambling, the TX data stream can be output to the portion of the TX data path 391 within the FEC 350. The TX data stream can, within the FEC 350, be subjected to transcoding (e.g., by the transcoder 354), CWM insertion at step 802 (e.g., by the CWM inserter 355), encoding (e.g., by RS encoder 356) and gear boxing (e.g., by the gear box 357). Following gear boxing, the TX data stream can be output to a PMA. Compensation for the CWM insertion by the CWM inserter 355 of the FEC 350 at step 802 is not provided by adding components to the FEC 350. Instead components within the integration block 381 halt the TX data stream for some number of cycles in the portions of the TX data path 391 within the PCS 310 and the FEC 350 to compensate at step 803 for the CWM insertion previously performed at step 802.

Specifically, referring to FIG. 3 in combination with FIGS. 4 and 5 described in detail above, at step 802, the method can include receiving a processing signal (e.g., a CWM_INSERTION signal 341). This CWM_INSERTION signal 341 can be received by a TX data path controller 393 of the integration block 381 from a data processor (e.g., the CWM inserter 355) within the portion of the TX data path 391 in the FEC 350. Based on the CWM_INSERTION signal 341, the number of clock cycles during which the TX data stream in the TX data path is to be halted to compensate for the CWM insertion can be determined by the TX data path controller 393. Then, a TX_DATA_HALT signal 342, which indicates this number of clock cycles, can be generated and transmitted to processing compensation logic (e.g., CWM insertion compensation logic 352) within the integration block 381, to the encoder and scrambler 312 within the PCS 310 and to the transcoder 354 within the FEC 350. In response, the CWM insertion compensation logic 352, the encoder and scrambler 312 and the transcoder 354 each halt all of their respective logic operations for the number of clock cycles indicated. Thus, the TX data stream is halted in the portions of the TX data path 391 in both the PCS 310 and FEC 350, thereby compensating for the processing time required for insertion of the CWMs into the TX data stream by the CWM inserter 355.

On the RX-side of the transceiver (or, if applicable, in an RX), an RX data stream, which is transmitted to the FEC 350 from a PMA, can enter the portion of the RX data path 392 within the FEC 350. This RX data stream can, within the FEC 350, be subjected to synchronizing (e.g., by CWM synchronizer 378), gear boxing (e.g., by gear box 377 so that it has frames with a 66b width), symbol error correction (e.g., RS decoder 376), removal of CWMs from the RS-side data stream (e.g., by CWM remover 375), and transcoding (e.g., by transcoder 274). Following transcoding, the RX data stream can be output to the portion of the RX data path 392 within the PCS 310. The RX data stream can, within the PCS 31—be subjected to decoding and descrambling (e.g., by the decoder and descrambler 273) and frequency variation compensation (e.g., by the RX clock compensation logic 331. Compensation for the CWM removal by the CWM remover 375 of the FEC 350 at step 802 is not provided by components added to the FEC 350. Instead components within the integration block 382 cause the RX clock compensation logic 331 within the PCS 310 to compensate at step 803 for the CWM deletion previously performed at step 802.

Specifically, referring to FIG. 3 in combination with FIGS. 6 and 7 described in detail above, at step 802, the method can include receiving a processing signal (e.g., a CWM REMOVAL signal 341). This CWM_INSERTION signal 341 can be received by a TX data path controller 393 of the integration block 381 from a data processor (e.g., the CWM inserter 355) within the portion of the TX data path 391 in the FEC 350. Based on the CWM_INSERTION signal 345, the number of clock cycles during which the RX data stream in the RX data path is to be halted to compensate for the CWM removal can be determined by the RX data path controller 394. Then, an RX_DATA_HALT signal 346, which indicates this number of clock cycles, can be generated and transmitted to processing compensation logic (e.g., CWM removal compensation logic 372) within the integration block 382, to the decoder and descrambler 332 within the PCS 310 and to the transcoder 374 within the FEC 350. In response, the CWM removal compensation logic 372, the decoder and descrambler 332 and the transcoder 374 each halt all of their respective logic operations for the number of clock cycles indicated. Thus, the RX data stream is halted in the portions of the RX data path 392 in both the PCS 310 and FEC 350, thereby compensating for the processing time required for removal of the CWMs from the RX data stream by the CWM remover 375.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should be understood that the terminology used herein is for the purpose of describing the disclosed devices and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Disclosed above are Ethernet physical layer devices (e.g., a transceiver, a receiver and a transmitter) with integrated physical coding and forward error correction sub-layers. Each physical layer device can include a physical coding sub-layer (PCS), a forward error correction sub-layer (FEC) and integration block(s). Each integration block can halt, for some number of clock cycles, a data stream in portions of a data path (e.g., portions of a transmitter (TX) data path or portions a receiver (RX) data path) within the PCS and the FEC in order to compensate for processing of that data stream by a data processor (e.g., a code word mark (CWM) inserter or a CWM remover) contained in the portion of the data path within the FEC. Use of such integration block(s) eliminates the need for redundant components in the PCS and FEC, thereby reducing latency, costs and chip area consumption. Also disclosed above are associated methods.

What is claimed is:

1. A physical layer device comprising:
   a physical coding sub-layer;
   a forward error correction sub-layer; and
   an integration block in direct communication with and operably connected to the physical coding sub-layer and further in direct communication with and operably and connected to the forward error correction sub-layer, the integration block halting, for a number of clock cycles, a data stream in portions of a data path within both the physical coding sub-layer and the forward error correction sub-layer so as to compensate for processing of the data stream by a data processor in a portion of the data path within the forward error correction sub-layer, wherein the integration block determines the number of clock cycles based on a processing signal received from the data processor.

2. The physical layer device of claim 1, the integration block comprising:
   processing compensation logic operably connected to clock compensation logic in a portion of the data path within the physical coding sub-layer; and
   a data path controller in communication with the data processor, the processing compensation logic and other components in the data path within both the physical coding sub-layer and the forward error correction sub-layer, the data path controller performing the following:
receiving the processing signal from the data processor;
based on the processing signal, determining the number of clock cycles during which the data stream in the data path is to be halted; and
generating and transmitting a data halt signal indicating the number of clock cycles to the processing compensation logic and the other components.

3. The physical layer device of claim 2, the processing compensation logic and the other components receiving the data halt signal from the data path controller and, in response to the data halt signal, halting all functions for the number of clock cycles indicated.

4. The physical layer device of claim 1, the data path being a transmitter data path and the data processor being a code word mark inserter that inserts code word marks into the data stream to allow for detection of data packet boundaries.

5. The physical layer device of claim 1, the data path being a receiver data path and the data processor being a code word mark remover that removes code word marks from the data stream.

6. The physical layer device of claim 1, wherein the physical layer device comprises at least one of a transmitter, a receiver and a transceiver.

7. A physical layer transceiver comprising:
a physical coding sub-layer;
a forward error correction sub-layer; and
a pair of physical coding sub-layer and forward error correction sub-layer integration blocks comprising:
a first integration block in direct communication with and operably connected to the physical coding sub-layer and further in direct communication with and operably connected to the forward error correction sub-layer, the first integration block halting, for a first number of clock cycles, a transmitter data stream in portions of a transmitter data path within both the physical coding sub-layer and the forward error correction sub-layer so as to compensate for code word mark insertion into the transmitter data stream by a code word mark inserter, the code word mark inserter being in a portion of the transmitter data path within the forward error correction sub-layer, wherein the first integration block determines the first number of clock cycles based on a code word mark insertion signal from the code word mark inserter; and,
a second integration block in communication with and operably connected to the physical coding sub-layer and in communication with and operably connected to the forward error correction sub-layer, the second integration block halting, for a second number of clock cycles, a receiver data stream in portions of a receiver data path within both the physical coding sub-layer and the forward error correction sub-layer so as to compensate for code word mark removal from the receiver data stream by a code word mark remover, the code word mark remover being in a portion of the receiver data path with the forward error correction sub-layer, wherein the second integration block determines the second number of clock cycles based on a code word mark remover signal from the code word mark remover.

8. The physical layer transceiver of claim 7, the first integration block comprising:

code word mark insertion compensation logic operably connected to transmitter clock compensation logic in a portion of the transmitter data path within the physical coding sub-layer; and
a transmitter data path controller in communication with the code word mark inserter, the code word mark insertion compensation logic and other transmitter components in the transmitter data path within both the physical coding sub-layer and the forward error correction sub-layer, the transmitter data path controller performing the following:
receiving the code word mark insertion signal from the code word mark inserter;
based on the code word mark insertion signal, determining the first number of clock cycles during which the transmitter data stream is to be halted; and
generating and transmitting a transmitter data halt signal indicating the first number of clock cycles to the code word mark insertion compensation logic and the other transmitter components.

9. The physical layer transceiver of claim 8, the code word mark insertion compensation logic and the other transmitter components receiving the transmitter data halt signal from the transmitter data path controller and, in response to the transmitter data halt signal, halting all functions for the first number of clock cycles indicated.

10. The physical layer transceiver of claim 8, the code word mark inserter inserting code word marks into the transmitter data stream to allow for detection of data packet boundaries.

11. The physical layer transceiver of claim 7, the second integration block comprising:
code word mark removal compensation logic operably connected to receiver clock compensation logic in a portion of the receiver data path within the physical coding sub-layer; and
a receiver data path controller in communication with the code word mark remover, the code word mark removal compensation logic, and other receiver components in the receiver data path within both the physical coding sub-layer and the forward error correction sub-layer, the receiver data path controller performing the following:
receiving the code word mark removal signal from the code word mark remover;
based on the code word mark removal signal, determining the second number of clock cycles during which the receiver data stream is to be halted; and
generating and transmitting a receiver data halt signal indicating the second number of clock cycles to the code word mark removal compensation logic and the other receiver components.

12. The physical layer transceiver of claim 11, the code word mark removal compensation logic and the other receiver components receiving the receiver data halt signal from the receiver data path controller and, in response to the receiver data halt signal, halting all functions for the second number of clock cycles indicated.

13. The physical layer transceiver of claim 8, the other transmitter components comprising:
an encoder and scrambler within the portion of the transmitter data path within the physical coding sub-layer, the encoder and scrambler receiving the transmitter data stream through a media independent interface and encoding and scrambling the transmitter data stream; and a transcoder within the portion of the transmitter data path within the forward error correction sub-layer, the transcoder receiving the transmitter data stream directly from the encoder and scrambler following the encoding and the scrambling, transcoding the transmitter data stream, and providing the transmitter data stream to the code word mark inserter following the transcoding.

14. The physical layer transceiver of claim 11, the other receiver components comprising:

a decoder and descrambler in the portion of the receiver data path within the physical coding sub-layer; and a transcoder in the portion of the receiver data path within the forward error correction sub-layer, the transcoder receiving the receiver data stream directly from the code word mark remover following removal of any code word marks, transcoding the receiver data stream and providing the receiver data stream to the decoder and descrambler following the transcoding, and the decoder and descrambler decoding and descrambling the receiver data stream and, following the decoding and the descrambling outputting the receiver data stream to a media independent interface.

15. A method comprising:

providing a physical layer device having a physical coding sub-layer, a forward error correction sub-layer, and an integration block in direct communication with and operably connected to the physical coding sub-layer and in direct communication with and operably connected to the forward error correction sub-layer; and halting, by the integration block for a number of clock cycles, a data stream in portions of a data path within both the physical coding sub-layer and the forward error correction sub-layer so as to compensate for processing of the data stream by a data processor in a portion of the data path within the forward error correction sub-layer, wherein the number of clock cycles is determined by the integration block based on a processing signal received from the data processor.

16. The method of claim 15, further comprising:

receiving, by a data path controller of the integration block, the processing signal from the data processor;

based on the processing signal, determining, by the data path controller, the number of clock cycles during which the data stream in the data path is to be halted;

generating, by the data path controller, a data halt signal indicating the number of clock cycles; and transmitting, by the data path controller, the data halt signal to processing compensation logic of the integration block and to other components in the data path within both the physical coding sub-layer and the forward error correction sub-layer.

17. The method of claim 16, further comprising:

receiving, by the processing compensation logic and the other components, the data halt signal from the data path controller and, based on the data halt signal, halting all functions for the number of clock cycles indicated.

18. The method of claim 15, the data path being a transmitter data path and the data processor being a code word mark inserter that inserts code word marks into the data stream to allow for detection of data packet boundaries.

19. The method of claim 15, the data path being a receiver data path and the data processor being a code word mark remover that removes code word marks from the data stream.

20. The method of claim 15, wherein the physical layer device comprises at least one of a transmitter, a receiver and a transceiver.

* * * * *